Oct. 27, 1953

K. W. JERNSTROM 2,656,810

HINGED WHEEL-SUPPORTED HATCH COVER

Filed Feb. 7, 1948

5 Sheets-Sheet 1

Inventor
KARL W. JERNSTROM

By McMetcalf
Agent

Inventor
KARL W. JERNSTROM
By McMetcalf
Agent

Inventor
KARL W. JERNSTROM

By McMetcalf
Agent

Inventor
KARL W. JERNSTROM

By M C Metcalf
Agent

HINGED WHEEL-SUPPORTED HATCH COVER

Filed Feb. 7, 1948 5 Sheets-Sheet 5

Inventor
KARL W. JERNSTROM
By McMetcalf
Agent

Patented Oct. 27, 1953

2,656,810

UNITED STATES PATENT OFFICE 2,656,810

HINGED WHEEL-SUPPORTED HATCH COVER

Karl W. Jernstrom, Verona, N. J., assignor to Seaboard Machinery Corporation, New York, N. Y., a corporation of New York Application February 7, 1948, Serial No. 6,877

4 Claims. (Cl. 114—201)

This invention relates to ship construction and especially to folding hatch covers of the type consisting of one or more sections hinged to the side of the hatch.

The most common method of covering a ship's cargo hatch is to lay planks across the opening and lash a tarpaulin over the planks to make the cover watertight. On a large hatch, considerable time and labor may be required to remove and replace this type of cover, and the planks must be stacked on the deck, taking up valuable space and hindering loading operations. Because of the high cost of maintaining a ship in port and the necessity of maintaining fast schedules in order to operate a cargo shipping line profitably, any device which results in cutting the time required for loading and unloading is of importance to shipowners.

As an improvement over the plank covering, several types of folding covers are now in use, generally consisting of hinged sections hinged to the hatch coaming. These covers fold either vertically or flat at the side of the hatch and are opened and closed with the aid of the ship's hoisting gear. While considerable time is saved by the use of the folding type of cover, tarpaulins are required to secure the covers and make the openings watertight.

The object of this invention is to provide a hatch cover of the folding type which is watertight in itself when closed and may be readily secured in a few minutes by means of attached locking clamps, thus eliminating the time and labor formerly required for handling and lashing tarpaulins.

Other objects are to produce a cover which is sufficiently strong for its purpose, but light in weight, which folds into a minimum of space, and on which worn gaskets may be easily replaced.

The cover shown here by way of illustration is of riveted construction especially suitable for manufacture from aluminum or similar light metals, but this type of cover may also be made of steel.

Figure 1:
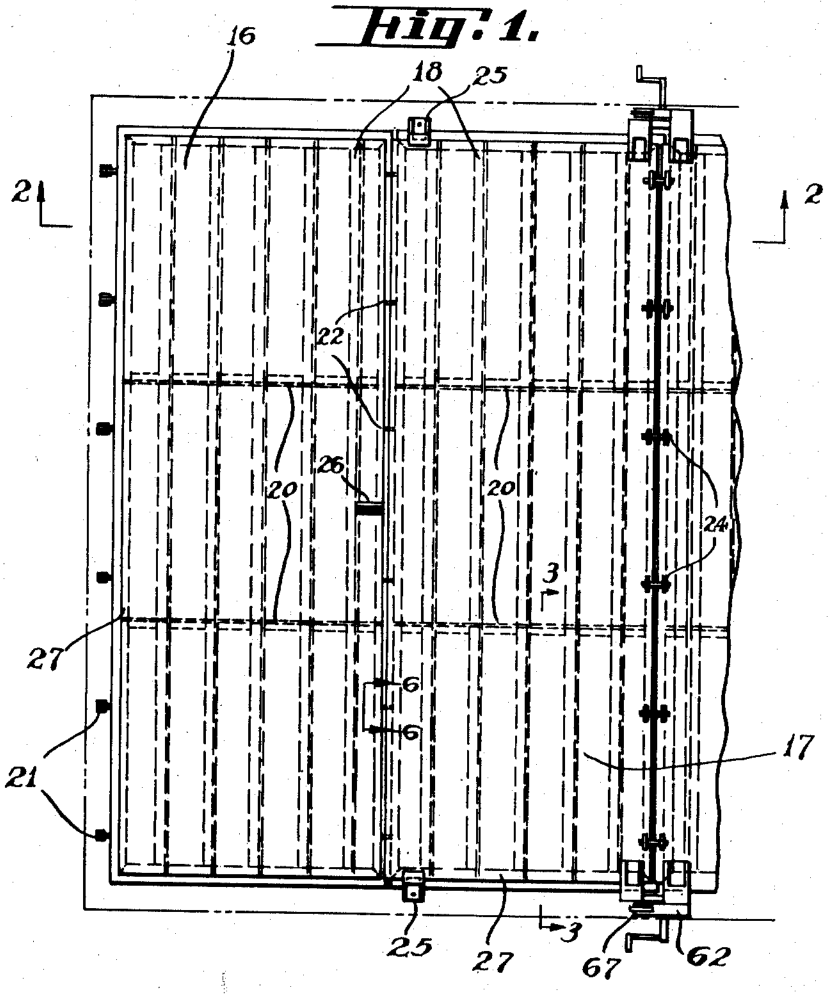
Fig. 1 is a plan view of a typical cover assembly.
Figure 2:
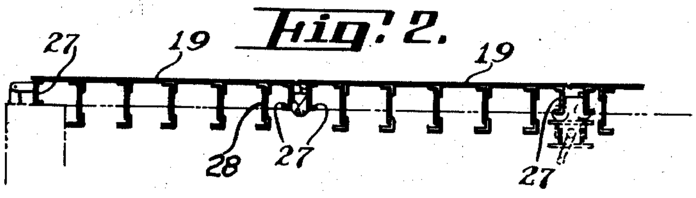
Fig. 2 is a partial cross-section along line 2—2 of Fig. 1.

Referring to Figs. 1 and 2, a typical cover assembly consists of two sections generally indicated by numerals 16 and 17. The sections are each made up of a top plate 19 to which are attached channel frame 27, longitudinal stiffeners 20, and transverse stiffeners 18. The sections are connected together along their adjoining edges by hinges 22 and section 16 is connected to the edge of the hatch opening by hinges 21. A second similar cover assembly, here shown partly broken away, is hinged to the opposite side of the hatch opening. Locking devices 24 hold the two cover assemblies together and locking devices 25 secure the covers to the deck.

Figure 3:
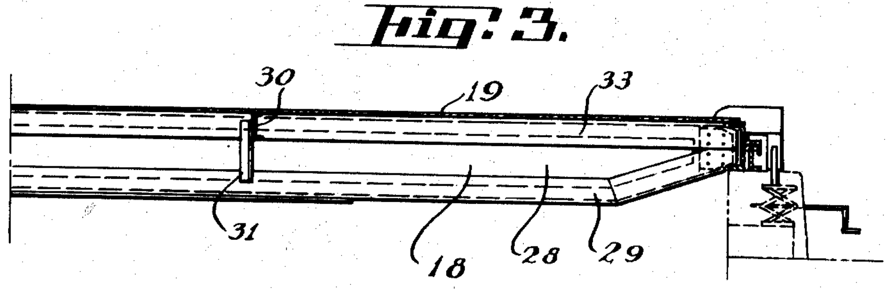
Fig. 3 is a partial cross-section along line 3—3 of Fig. 1.
Figure 4:
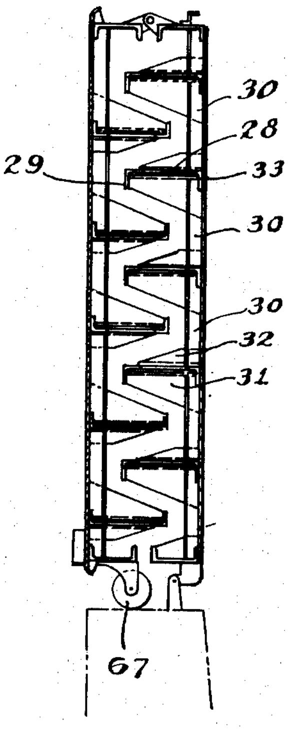
Fig. 4 is a cross-section of a cover in the raised position, particularly showing the longitudinal and lateral stiffener construction.

The stiffener construction is shown in Figs. 3 and 4. Transverse stiffeners 18 are channel-shaped members running the full width of the cover and tapered at the ends as shown in Fig. 3. The stiffeners 18 may be formed from a standard channel, but are here shown as made up of angles 29 and 33 connected by web plate 28. Angles 33 are riveted, or otherwise fastened to the top plate 19. A number of short channels 30 are riveted to the top plate longitudinally between the transverse stiffeners and connected to stiffeners 18 by brackets 31 and 32. The staggered arrangement of the stiffeners permits the cover to fold into a minimum of space as shown in Fig. 4.

Figure 5:
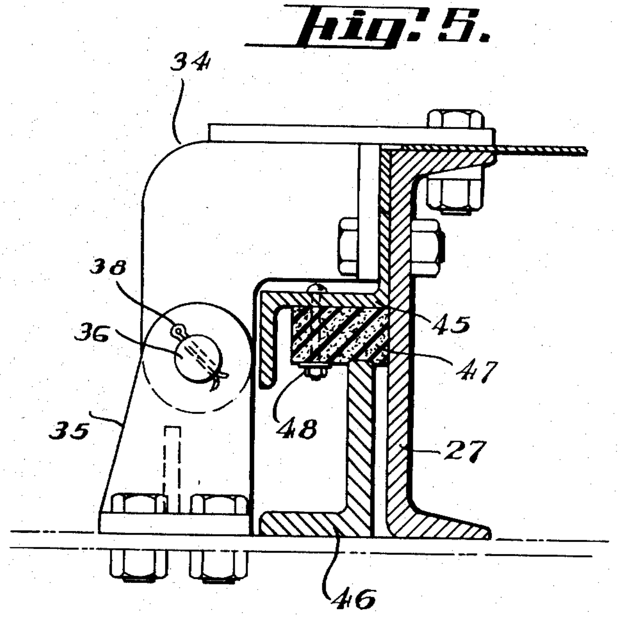
Fig. 5 is a side view of one of the coaming hinges with the connecting edge of the cover shown in cross-section.
Figure 6:
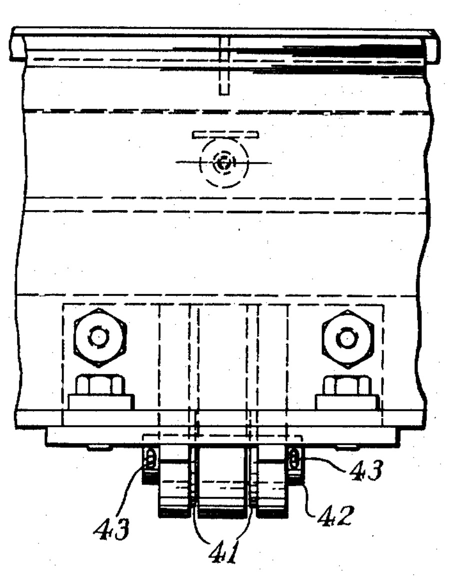
Fig. 6 is a partial cross-section through line 6—6 of Fig. 1 showing one of the cover hinges.
Figure 10:
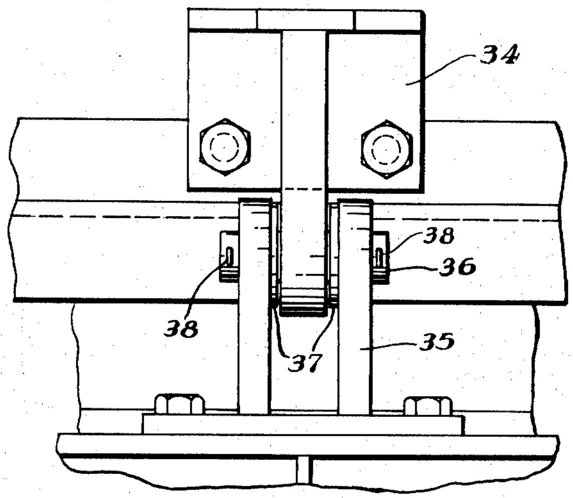
Fig. 10 is a front elevation of the hinge of Fig. 5.

The coaming hinge shown in Figs. 5 and 10 consists of a slotted bracket 35, which is bolted to the hatch framing, bracket 34 which is bolted to the cover, and hinge pin 36. The hinge brackets are made up of welded steel plate. Bronze washers 37 are inserted between the brackets to reduce friction. The hinge pin 36 is secured in place by cotter pins 38.

The hinges between cover sections are of similar construction except for the shape of the hinge brackets 39 and 40 which are designed to fasten to the under sides of channel frames 27. The brackets 39 and 40 are held together, spaced by bronze washers 41, by hinge pin 42 secured by cotter pins 43. If the cover is made of aluminum, a layer of insulating tape 44 is inserted between steel and aluminum parts to prevent corrosion due to electrolytic action.

Figure 7:
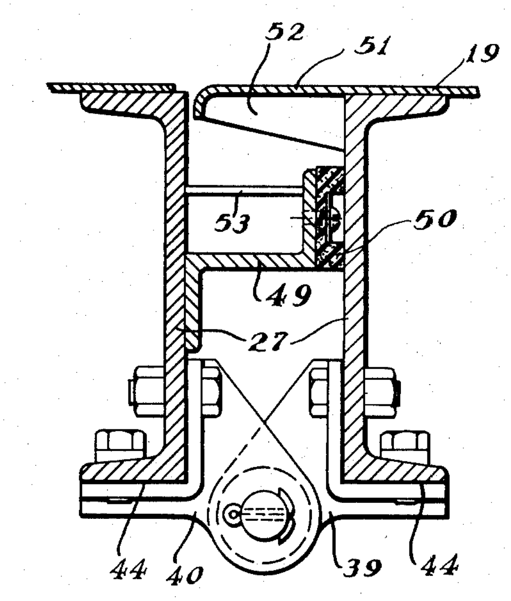
Fig. 7 is a side view of the hinge of Fig. 6 with adjacent parts of the cover shown in cross-section.
Figure 12:
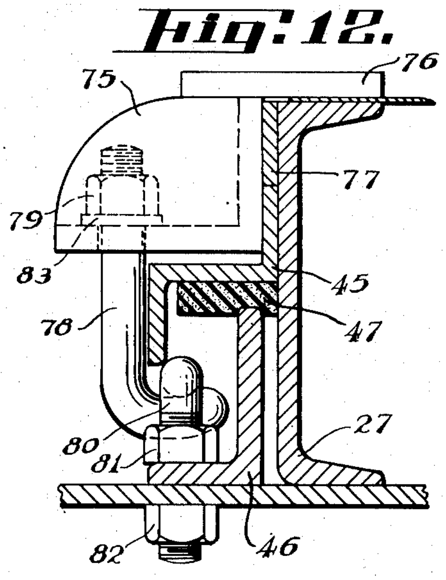
Fig. 12 is a side elevation of the device of Fig. 11 with adjacent parts of the cover shown in cross-section.
Figures 14, 16:
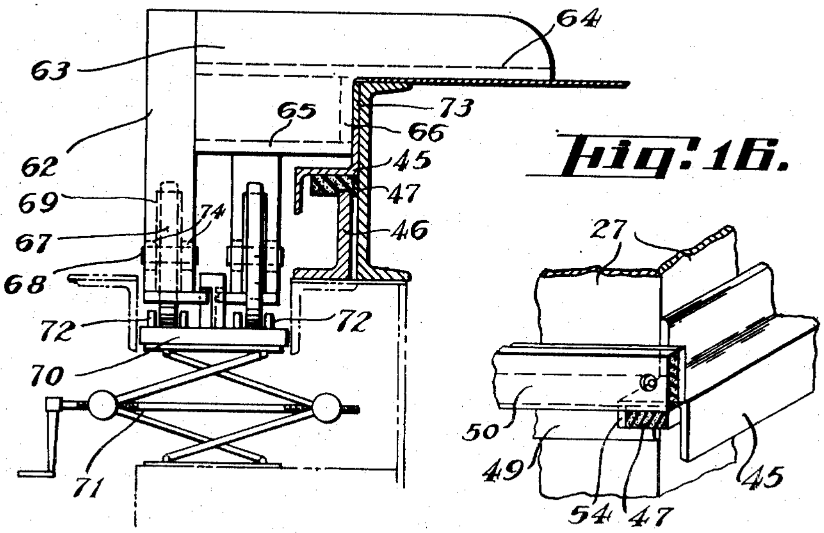
Fig. 14 is a front view of the roller assembly of Fig. 13, with adjacent parts of the cover shown in cross-section.
Fig. 16 is an isometric view showing the gasket arrangement at a free corner of the cover.

The cover is made waterproof by suitably located gaskets of rubber or similar compressible material. The arrangement at the edges of the hatch is shown in Fig. 5 and Fig. 12. Z members 45 are riveted to the channel frames 27 and, when the cover is closed, interlock with angles 46, fastened to the hatch framing. Gaskets 47 are held on the under side of the Z's by screws 48 and engage the upstanding leg of angles 46. At the hinged edge between cover sections and where two cover assemblies meet, a Z member 49 is riveted to one section as shown in Fig. 7 and carries on its outer flange a gasket 50 which is pressed against the edge-channel 27 of the opposite cover section. The Z member 49 is reinforced at intervals along its length by bars 53. The joint is covered by overhanging edge 51 of top plate 19, reinforced at intervals by chocks 52. At the corner of the cover which carries Z member 49, the outer leg of the Z and the gasket 50 are continued beyond the edge of the cover, as shown in Fig. 16. The outer leg and web of Z member 45 are likewise extended beyond the corner of the cover and the web is welded to the extension of member 49. A block 54 is welded to the under side of the web of member 49 flush with the edge of the cover to form a seat for gasket 47 which extends to the outer edge of gasket 50 and meets the corresponding gasket 47 of the adjoining cover.

Figure 8:
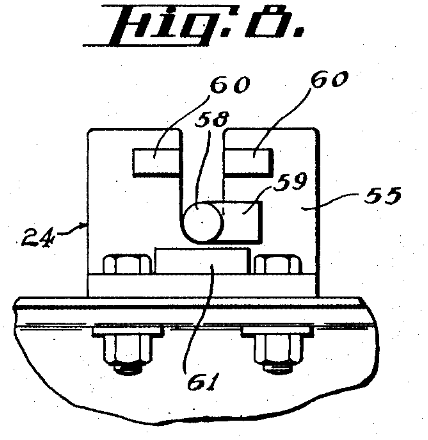
Fig. 8 is a front elevation of one of the locking devices 24.
Figure 9:
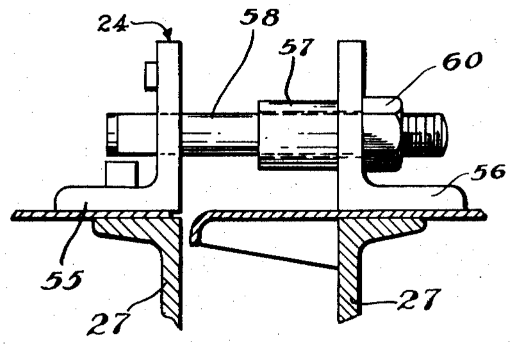
Fig. 9 is a side elevation of the device of Fig. 8, with adjacent parts of the cover shown in cross-section.

The gap between covers 16 and 17, the hinges 26, and the Z member 49, are so proportioned that adequate pressure is applied to gasket 50 to make the hinged joint watertight when the cover is laid flat. The joint between cover assemblies is secured by drawing up locking clamps 24. One of these is shown in Figs. 8 and 9. Angle brackets 55 and 56 are bolted to the frames of adjoining covers. Sleeve 57 is welded to bracket 56 and holds a rod 58, to the end of which is welded a tab 59. The other end of rod 58 is threaded, preferably with an Acme thread. Nut 60 rides on the threaded end of rod 58. Bracket 55 is slotted to receive rod 58. Block 61 engages tab 59 and prevents rod 58 from turning when it is in the position shown. When nut 60 is turned to tighten the lock, rod 58 moves back against the upstanding leg of bracket 55 and is prevented from turning in that position by blocks 60.

Figure 13:
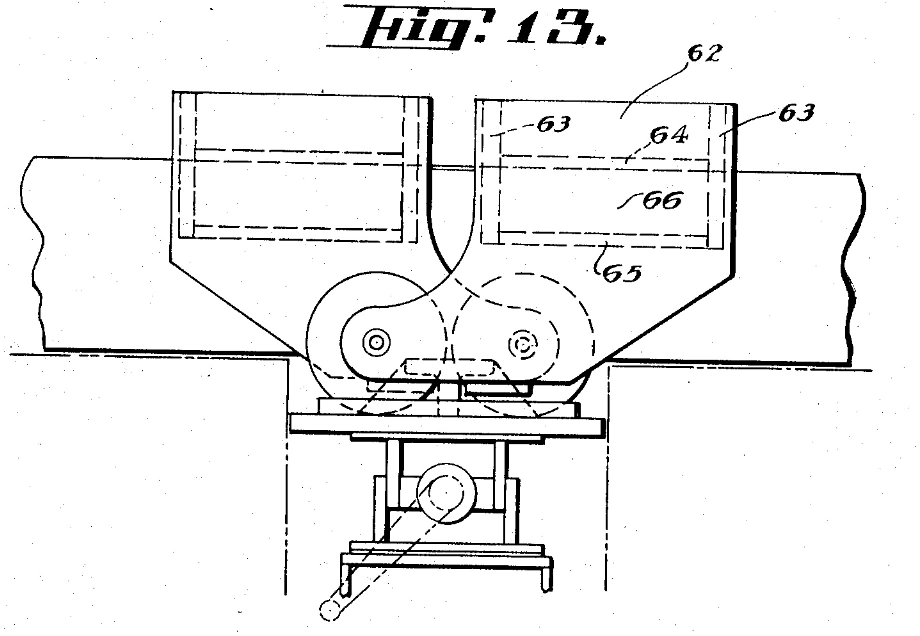
Fig. 13 is a side view of the rollers attached to the free edges of the covers.

To facilitate opening and closing, the free ends of the cover assemblies are provided with rollers which run along the edge of the hatch. A pair of opposite roller assemblies is shown in Figs. 13 and 14. Steel plates or castings 62 are welded to ribs 63. Plates 64, 65 and 66 are welded together and to plate 62 and ribs 63 to form a box-like angular bracket which fits over the edge of the cover and may be bolted or welded thereto. A metal pad 73 is inserted above Z member 45. Plates 62 are slotted to receive wheels 67 which are fixed to axles 68 journaled in bronze bushings 74. The end of each plate 62 extends beyond the meeting edge of the adjacent cover as shown in Fig. 13. The construction of the roller bracket on opposing cover assemblies is similar in every way except that one bracket is made shorter than the other as shown in Fig. 1 to produce the staggered wheel arrangement shown in Fig. 14.

When the cover is closed, the wheels rest on a platform 70, which may be raised and lowered by scissors jack 71. When the platform is raised to deck level, gasket 47 is lifted clear of angle 46, so as to free the cover for opening. In the position shown, the cover is tightly closed. The platform 70, as shown in Fig. 14, is provided with two pairs of guides 72 which serve to form a pair of tracks for the wheels, each track receiving one of the wheels 67.

Figure 11:
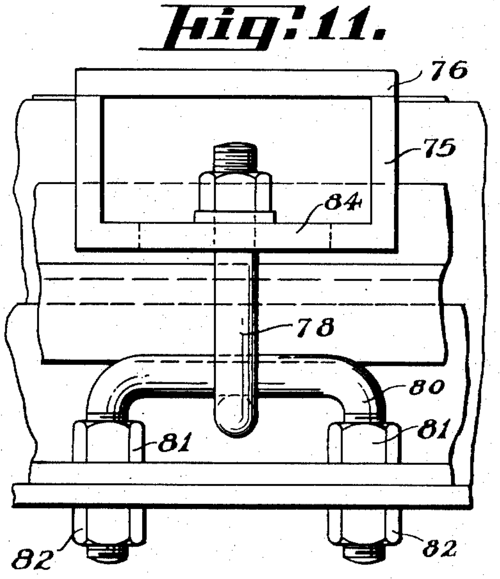
Fig. 11 is a front elevation of one of the locking devices 25.

One of the clamps 25, which lock the cover down, is shown in detail in Figs. 11 and 12. A cast or welded U-shaped member 75 is welded to plate 76 and the assembled bracket bolted to the edge of the cover. Hook 78 extends through slot 84 in member 75 and is threaded, preferably with an Acme thread on its upper end. The hook engages eye 80 which is threaded at its ends and secured to the deck by nuts 81 and 82. The hook may be tightened to draw down the cover by turning nut 79 which rides on washer 83. The clamp may be readily released by loosening nut 79 and disengaging the hook 78 from eye 80.

Figure 15:
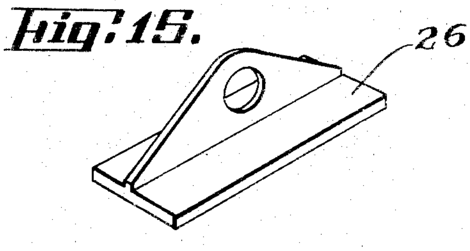
Fig. 15 is an isometric view of the lifting device 26.

The lifting eye 26, shown in Fig. 15, may be cast or fabricated from steel plate and is welded or bolted to cover 16 in the position shown in Fig. 1.

The procedure in opening the cover is to release clamps 24 and 25, raise platforms 70 to the deck level, attach a hook from the ship's hoisting gear to eye 26 and hoist the cover to the vertical position. In closing, the cover is lowered until wheels 67 engage the side of the hatch. The covers will then roll into the closed position because of their own weight. When the wheels have come to rest on platform 70, the platform is lowered and the locking clamps are secured. It is apparent that these operations may be performed in a few minutes and with a minimum of effort by one or two men and that the use of these covers completely eliminates the slow and laborious handling of heavy planks and tarpaulins formerly required for making the hatch watertight.

Since certain changes may be made in the above described article and different embodiments of the invention could be made without departing from the scope thereof, it is intended that all matter contained in the above description or shown in the accompanying drawings shall be interpreted as illustrative only and not in a limiting sense.

What is claimed:

1. In combination with a hatch opening surrounded by a coaming, a hatch cover comprising two cover assemblies hinged to opposite ends of the hatch opening, at least one of said assemblies having two or more sections hinged together, each hinged assembly being provided with wheels at its outer edge adapted to roll along the edge of the hatch opening outwardly of said coaming and support the assembly during opening and closing operations, a member secured to the outer edges of each said cover assembly located inwardly of said wheels, said member providing an inverted channel, a gasket in said channel, a projection on said coaming adjacent said channel and contacting said gasket when the hatch cover is closed, a platform located at the edge of the hatch opening outwardly of said coaming in the path of said wheels in the area of said wheels when the hatch cover is closed, and means for raising and lowering said platform to and from the level of the edge of the hatch opening to bring said gasket and said projection into and out of contact when the hatch cover is closed.

2. Apparatus in accordance with claim 1, wherein the wheels on the outer edge of each hinged assembly extend beyond the meeting edge of the adjacent assembly and the wheels of one assembly are located outwardly of the wheels of said adjacent assembly, each said platform being of a length capable of receiving the wheels of the two adjacent assemblies.

3. Apparatus in accordance with claim 2, wherein said means for raising and lowering said platform comprises a scissor jack arrangement.

4. Apparatus in accordance with claim 2, wherein said platform is provided with two pairs of guides extending the length thereof, one pair of which is located outwardly of the other pair, the space between the guides in each pair being sufficient to receive one of said wheels.

KARL W. JERNSTROM.

References Cited in the file of this patent

UNITED STATES PATENTS

| Number | Name | Date |
|---|---|---|
| 934,456 | McGray | Sept. 21, 1909 |
| 1,028,263 | Oldham | June 4, 1912 |
| 1,821,595 | Von Tell | Sept. 1, 1931 |
| 1,877,361 | Perkins | Sept. 13, 1932 |
| 2,256,087 | Hay | Sept. 16, 1941 |
| 2,379,623 | Campbell | July 3, 1945 |
| 2,447,906 | Groppell | Aug. 24, 1948 |

FOREIGN PATENTS

| Number | Country | Date |
|---|---|---|
| 316,423 | Italy | Apr. 6, 1934 |
| 370,653 | Great Britain | Apr. 14, 1932 |
| 409,231 | Great Britain | Apr. 26, 1934 |
| 472,670 | Great Britain | Sept. 28, 1937 |
| 934,456 | France | Sept. 21, 1909 |